March 20, 1956 H. McK. ELSEY 2,739,256
CURRENT COLLECTOR FOR DYNAMOELECTRIC MACHINES
Filed June 30, 1954

WITNESSES:
E. A. McCloskey.
Wm. L. Groome.

INVENTOR
Howard M. Elsey.
BY
ATTORNEY

United States Patent Office 2,739,256
Patented Mar. 20, 1956

2,739,256

CURRENT COLLECTOR FOR DYNAMOELECTRIC MACHINES

Howard McKee Elsey, Oakmont, Pa., assignor to Westinghouse Electric Corporation, East Pittsburgh, Pa., a corporation of Pennsylvania Application June 30, 1954, Serial No. 440,438

8 Claims. (Cl. 310—231)

The present invention relates to dynamoelectric machines and, more particularly, to the current collecting members of such machines, such as collector rings and commutators.

The rotating current collecting members of dynamoelectric machines have usually been made of substantially pure copper, with carbon brushes engaging the rotating members. When such machines, with copper collector rings or commutators and carbon brushes, have been used at high altitudes, however, as on aircraft, it has been found that the brushes would wear very rapidly and usually would actually disintegrate into carbon dust at a rapid rate. This dusting reduces the life of the brushes to such a short period that it has been impossible to use ordinary carbon brushes in motors and generators for use on aircraft.

This problem has been overcome, as disclosed and claimed in my Patent No. 2,414,514, by impregnating the brushes with a non-hygroscopic metal halide, such as barium fluoride or lead iodide, and brushes treated in this way have very good life at high altitude and have been extensively and successfully used. This brush treatment, however, is relatively expensive and has the disadvantage, at least under some conditions, of increasing the contact drop between the brush and the current collector, as well as tending to increase the brush friction. These effects are undesirable because they tend to raise the brush temperature.

The principal object of the present invention is to provide a current collector member for dynamoelectric machines which prevents dusting, or rapid wear, of untreated carbon brushes at high altitudes, or under other conditions where rapid brush wear occurs with the usual copper current collector members.

Another object of the invention is to provide a current collector member for dynamoelectric machines made of an alloy of copper and nickel, which substantially prevents dusting or rapid wear of untreated carbon brushes, and thus permits the use of such brushes under conditions where treated brushes have been necessary heretofore.

Figure 1:
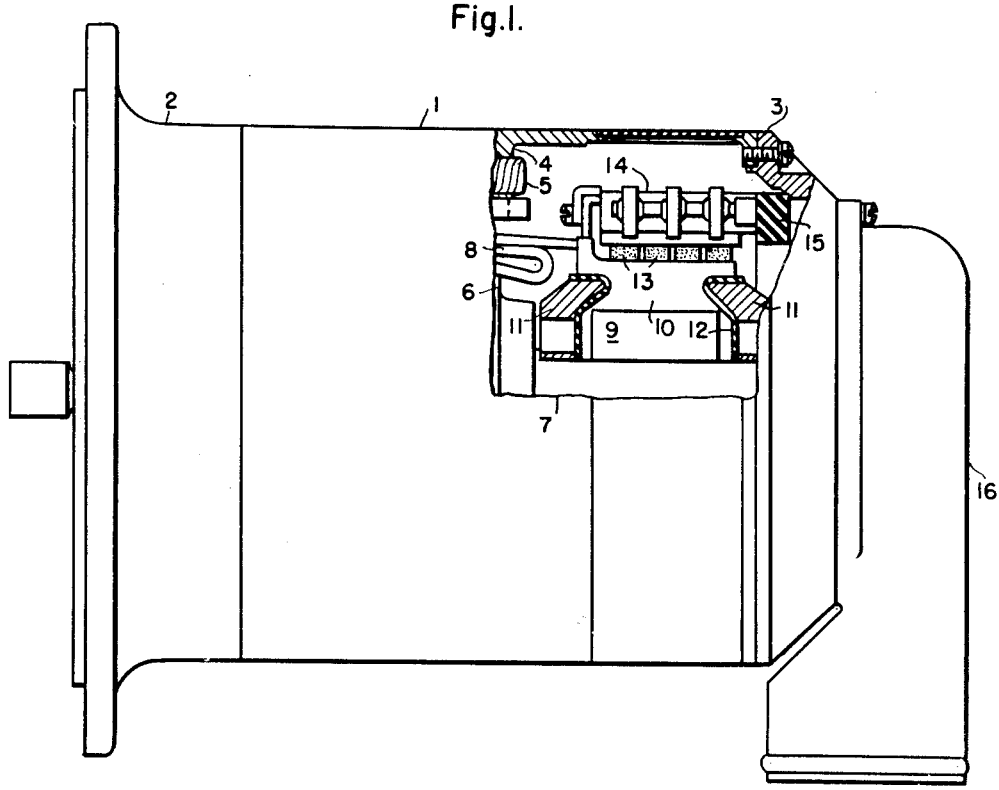
Figure 2:
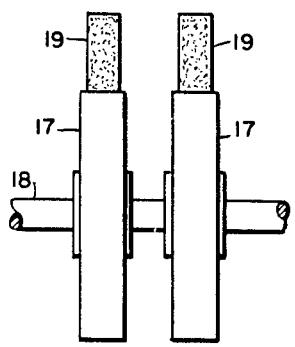

Other objects and advantages of the invention will be apparent from the following detailed description, taken in connection with the accompanying drawing, in which:

Figure 1 is a view in side elevation, partly broken away, of a direct-current generator; and Fig. 2 is a view of a collector ring assembly.

The invention is applicable to any type of current collector member for any type of dynamoelectric machine, or in general to any device in which electrical contact must be made to a rotating member. A direct-current generator of the type usually used on aircraft is shown by way of example in Fig. 1. This machine has a frame member 1 with end brackets 2 and 3 of any suitable type at each end. Pole pieces 4 are supported on the frame 1 and carry field windings 5. The machine has an armature member 6 mounted on a shaft 7 and carrying suitable armature windings 8. The armature winding 8 is connected to a commutator 9 mounted on the shaft 7. The commutator 9 may be of any usual or desired construction and is shown as consisting of a plurality of commutator bars 10 insulated from each other and clamped in a cylindrical assembly by means of V-rings 11, which engage in V-grooves in the commutator bars and are insulated from them by suitable insulation 12. Stationary brushes 13, which may be made of carbon or carbonaceous material, engage the surface of the commutator 9 and are supported in brush-holders 14 of any suitable type mounted on a rocker ring 15 attached to the end bracket 3. An air shield 16 may be mounted on the bracket 3 to direct a blast of cooling air into the machine.

The invention may also be applied to collector rings such as are shown in Fig. 2. In this figure, there are shown two conducting rings 17 mounted on, and insulated from, a shaft 18 which may, for example, be the shaft of the rotating field member of an alternating-current generator, or other rotating element having electrical windings to which connection must be made. Stationary brushes 19, which may be supported in any suitable manner, are shown engaging the rings 17 to make electrical contact therewith. The brushes 19 may be similar to the brushes 13 and are made of carbon, or carbonaceous material.

As previously explained, it has been found that if the commutator bars 10 or collector rings 17 are made of substantially pure copper, as in the usual construction, and are used with untreated carbon brushes, the brushes will rapidly disintegrate into carbon dust when the machine is operated at high altitude, and the use of untreated carbon brushes in aircraft equipment has been considered impractical for this reason. The brush treatment which has been used to prevent dusting, consisting of impregnating the brushes with a metallic halide, has been effective, but has the disadvantages previously mentioned of increasing the brush contact drop as well as tending to increase the friction of the brush on the commutator. These effects tend to undesirably raise the brush temperature during operation. The treatment is also relatively expensive.

I have found that if the commutator bars 10 or collector rings 17 are made of an alloy of copper and nickel containing at least 15% nickel, ordinary untreated carbon brushes can be used and no dusting or abnormally rapid wear of the brushes occurs at high altitudes. The minimum nickel content required to obtain this result is approximately 15%, the remainder of the alloy being substantially all copper, and an alloy of this composition substantially prevents dusting of the brushes, at least at moderate altitudes. At higher altitudes, a greater amount of nickel is desirable, and the preferred composition of the alloy is from 55% to 60% nickel and substantially from 45% to 40% copper. An alloy of this composition prevents dusting and greatly increases the brush life even at very high altitudes. Alloys of higher nickel content are also effective, and collector rings or commutators made of pure nickel will prevent dusting of the brushes. High nickel contents, however, tend to increase the electrical resistance of the material and are less desirable than the range of nickel content indicated above. It will be understood that the nickel content may be reduced below the preferred amount, and alloys with a nickel content of the order of 30% will prevent dusting of the brushes, or abnormally rapid wear, at altitudes of the order of 60,000 feet, although the rate of wear will be greater than with higher nickel content. Still lower nickel content is effective at lower altitudes, and the nickel may be reduced to as little as 15% and still provide substantial protection against dusting of the brushes at moderate altitudes.

It will be evident that by the use of this copper-nickel alloy for the current collecting members of dynamoelectric machines, it is possible to use untreated carbon brushes for operation at high altitudes, and thus the expense and other disadvantages of the treated brushes which have been used heretofore are avoided. The temperature of untreated brushes operating on collector rings or commutators of this alloy is materially lower than the temperatures reached by treated brushes operating on copper colilector members, under the same conditions, due to the lower contact drop of the untreated brushes, and probably lower friction of the brushes on the current collector. The new material has the further advantage that it can readily be cast, while the pure copper which has been used heretofore can only be worked by forging or rolling, so that the cost of producing commutator bars or collector rings can be materially reduced.

Another important advantage of current collector members of the copper-nickel alloy used with untreated carbon brushes is that little or no ground operation is required prior to operation at high altitude. When brushes treated with a metal halide have been used on copper collector members, it has been necessary to operate them at full electrical load for an extended period at ground level, to form the necessary film on the surface of the collector, before they could safely be used under altitude conditions. With the new collector members and untreated brushes, however, satisfactory operation at high altitude is obtained without any preliminary ground operation.

The preceding description has stated the advantages of the new current collector members mainly with reference to operation at high altitudes in aircraft generators and motors, but collector members made of this alloy are also advantageous for certain sea level or ground applications where rapid brush wear is a problem. Thus, the new alloy can be used in many applications where adverse conditions of service exist and greatly increased brush life can be obtained. Since the alloy has greater mechanical strength than pure copper, it may also be used to advantage in certain places, such as in the collector rings of high-speed turbogenerators, where steel is now used for reasons of mechanical strength.

It should now be apparent that a current collector has been provided which is very advantageous, especially for high altitude use, since it makes it possible to use ordinary untreated carbon brushes and thus avoid the disadvantages of the brush treatments which have heretofore been necessary. It will be understood that the invention is applicable to either collector rings or commutators, or in general to any type of rotating current collecting device for use in any type of dynamoelectric machine, or other device in which electrical contact must be made to a rotating member.

I claim as my invention:

1. In a dynamoelectric machine, a rotatable current collecting member, and a stationary brush of carbonaceous material engaging the current collecting member, said current collecting member being formed of an alloy of copper and nickel containing in excess of 15% nickel.

2. In a dynamoelectric machine, a rotatable current collecting member, and a stationary brush of carbonaceous material engaging the current collecting member, said current collecting member being formed of an alloy containing from 15% to 100% nickel and substantially from 85% to 0% copper.

3. In a dynamoelectric machine, a rotatable current collecting member, and a stationary brush of carbonaceous material engaging the current collecting member, said current collecting member being formed of an alloy containing from about 30% to 100% nickel and substantially from 70% to 0% copper.

4. In a dynamoelectric machine, a rotatable current collecting member, and a stationary brush of carbonaceous material engaging the current collecting member, said current collecting member being formed of an alloy containing 55% to 60% nickel and substantially 45% to 40% copper.

5. In a dynamoelectric machine, a rotatable collector ring and a brush of carbonaceous material engaging the collector ring, said collector ring comprising an annular member made of an alloy of copper and nickel containing not less than 15% nickel.

6. In a dynamoelectric machine, a rotatable collector ring and a brush of carbonaceous material engaging the collector ring, said collector ring comprising an annular member made of an alloy containing from 30% to 100% nickel and substantially from 70% to 0% copper.

7. In a dynamoelectric machine, a commutator comprising a plurality of commutator bars and means for clamping the bars into a cylindrical commutator assembly, and a brush of carbonaceous material engaging the commutator, said bars being made of an alloy of copper and nickel containing not less than 15% nickel.

8. In a dynamoelectric machine, a commutator comprising a plurality of commutator bars and means for clamping the bars into a cylindrical commutator assembly, and a brush of carbonaceous material engaging the commutator, said bars being made of an alloy containing from 30% to 100% nickel and substantially from 70% to 0% copper.

References Cited in the file of this patent

UNITED STATES PATENTS

| | | |
|---|---|---|
| 276,233 | Edison | Apr. 24, 1883 |
| 1,222,999 | Sandell | Apr. 17, 1917 |
| 1,248,924 | Sandell | Dec. 4, 1917 |

FOREIGN PATENTS

| | | |
|---|---|---|
| 522,092 | France | Mar. 21, 1921 |

OTHER REFERENCES

Proceedings of the Institution of Elec. Engineering, part II, vol. 101, June 1954; Savoy Place, London; pages 217, 222 and 223.